(12) United States Patent
Otsuka et al.

(10) Patent No.: US 9,400,198 B2
(45) Date of Patent: Jul. 26, 2016

(54) FLOW SENSOR AND CONTROL SYSTEM OF INTERNAL COMBUSTION ENGINE

(71) Applicant: Mitsubishi Electric Corporation, Chiyoda-ku, Tokyo (JP)

(72) Inventors: Kazuhiko Otsuka, Chiyoda-ku (JP); Yuji Ariyoshi, Chiyoda-ku (JP); Masahiro Kawai, Chiyoda-ku (JP); Shinichiro Hidaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 273 days.

(21) Appl. No.: 14/276,060

(22) Filed: May 13, 2014

(65) Prior Publication Data

US 2015/0185061 A1 Jul. 2, 2015

(30) Foreign Application Priority Data

Dec. 26, 2013 (JP) ................................. 2013-268419

(51) Int. Cl.
*G01F 1/68* (2006.01)
*G01F 1/69* (2006.01)
*F02D 1/00* (2006.01)
*G01F 1/696* (2006.01)
*G01F 1/699* (2006.01)

(52) U.S. Cl.
CPC .. *G01F 1/69* (2013.01); *F02D 1/00* (2013.01); *G01F 1/696* (2013.01); *G01F 1/699* (2013.01)

(58) Field of Classification Search
CPC ........... G01F 1/69; G01F 1/696; G01F 1/699; F02D 1/00
USPC ................. 73/114.34, 152.33, 170.12, 202.5, 73/204.11, 204.12, 204.16, 204.19
See application file for complete search history.

(56) References Cited

U.S. PATENT DOCUMENTS

| 5,703,288 A * | 12/1997 | Horiguchi ............. G01F 1/6845 73/204.26 |
| 6,134,960 A | 10/2000 | Yamakawa et al. |
| 6,729,182 B2 * | 5/2004 | Uramachi ............. G01F 1/6842 73/202.5 |
| 6,805,003 B2 * | 10/2004 | Ueki ..................... G01F 1/6845 73/204.26 |
| 6,862,930 B1 * | 3/2005 | Kohno .................... G01F 1/699 73/204.26 |
| 2002/0043103 A1 * | 4/2002 | Uramachi ............. G01F 1/6842 73/202.5 |

FOREIGN PATENT DOCUMENTS

JP 11-201793 A 7/1999

* cited by examiner

*Primary Examiner* — Lisa Caputo
*Assistant Examiner* — Jonathan Dunlap
(74) *Attorney, Agent, or Firm* — Sughrue Mion, PLLC

(57) ABSTRACT

In a flow sensor, an upstream heating element and a downstream heating element are disposed, respectively, upstream and downstream in a flow direction of a fluid so as to undergo mutual thermal interference. By controlling heating currents flown through the respective heating elements, an average temperature control portion maintains an average temperature of the two heating elements at a temperature predetermined degrees higher than a temperature of the fluid detected by a fluid temperature detection portion while a voltage ratio control portion performs control so that a temperature difference or a ratio of applied voltages between the two heating elements takes a predetermined value. A detection signal corresponding to a flow direction of the fluid is obtained from a state of the control on the heating currents and whether a flow direction of the fluid is forward or backward is determined.

10 Claims, 7 Drawing Sheets

FLOW SENSOR AND CONTROL SYSTEM OF INTERNAL COMBUSTION ENGINE

BACKGROUND OF THE INVENTION

1. Field of the Invention

The present invention relates to a flow sensor that not only detects a flow rate of a fluid but also obtains a detection signal that varies depending on a flow direction of the fluid by electrically detecting an amount of heat transmitted to the fluid from a heating element disposed in the fluid, and to a control system of an internal combustion engine.

2. Description of the Related Art

Generally, in a thermal flow sensor, a heating element and a fluid temperature detection element are disposed in a fluid and a bridge circuit is formed of the heating element, the fluid temperature detection element, and multiple resistors, so that a heating current supplied to the heating element is controlled for the bridge circuit to constantly maintain an equilibrium condition.

Accordingly, a temperature of the heating element is constantly maintained at a temperature predetermined degrees higher than a temperature of the fluid detected by the fluid temperature detection element.

A type used extensively is so-called a heating current detection type that uses a heating current as a detection signal by exploiting dependency of a heating current on a flow rate of the fluid. However, this detection signal is to detect an absolute value of the flow rate and there is a problem that both of a forward flow and a backward flow have the same value independently of a flow direction of the fluid.

In order to solve this problem, there is a method of obtaining a detection signal that varies depending on a flow direction of the fluid by forming bridge circuits using two sets of heating elements and fluid temperature detection elements disposed upstream and downstream in a flow direction of the fluid so as to undergo mutual thermal interference and using a difference between heating currents supplied to the respective heating elements as a detection signal (for example, see Patent Document 1).

[Patent Document 1] JP-A-11-201793

The method of Patent Document 1, however, requires two sets of bridge circuits and therefore requires a complex and large-scale circuit, and such a requirement becomes an obstacle to a reduction in size and cost.

Further, in order to detect a flow rate with high accuracy, the two bridge circuits need to have characteristics that are quite alike. It is therefore extremely difficult to manufacture these bridge circuits.

SUMMARY OF THE INVENTION

The invention was devised to solve the problems discussed above and has an object to obtain a detection signal that varies depending on a flow direction of a fluid with ease and accuracy at low cost using a simple circuit in a flow sensor.

The invention was devised to solve the problems discussed above and has another object to obtain a detection signal that varies depending on a flow direction of a fluid with ease and accuracy at low cost using a simple circuit in a control system of an internal combustion engine employing a flow sensor.

A flow sensor according to one aspect of the invention includes: a fluid temperature detection portion that detects a temperature of a fluid; first and second heating elements that are disposed, respectively, upstream and downstream in a flow direction of the fluid so as to undergo mutual thermal interference; a first control portion that controls heating currents flown through the respective first and second heating elements so that an average temperature of the first and second heating elements is maintained at a temperature predetermined degrees higher than the temperature of the fluid detected by the fluid temperature detection portion; and a second control portion that controls the heating currents flown through the respective first and second heating elements so that one of a temperature difference between the first and second heating elements and a ratio between voltages applied to the respective first and second heating elements takes a predetermined value. A detection signal corresponding to the flow direction of the fluid is obtained by the second control portion.

A control system of an internal combustion engine according to another aspect of the invention is a control system of an internal combustion engine provided to an internal combustion engine and controlling the internal combustion engine, and the flow sensor configured as above is provided to an intake system assembly of the internal combustion engine and determines whether a flow of intake air to the intake system assembly is forward or backward.

According to the flow sensor configured as above, it becomes possible to obtain a detection signal corresponding to a flow direction of the fluid with ease and accuracy at low cost using a simple circuit in a thermal flow sensor of a heating current detection type.

Also, according to the control system of an internal combustion engine configured as above, by employing the flow sensor as above, it becomes possible to obtain a detection signal corresponding to a flow direction of the fluid with ease and accuracy at low cost using a simple circuit.

The foregoing and other objects, features, aspects, and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
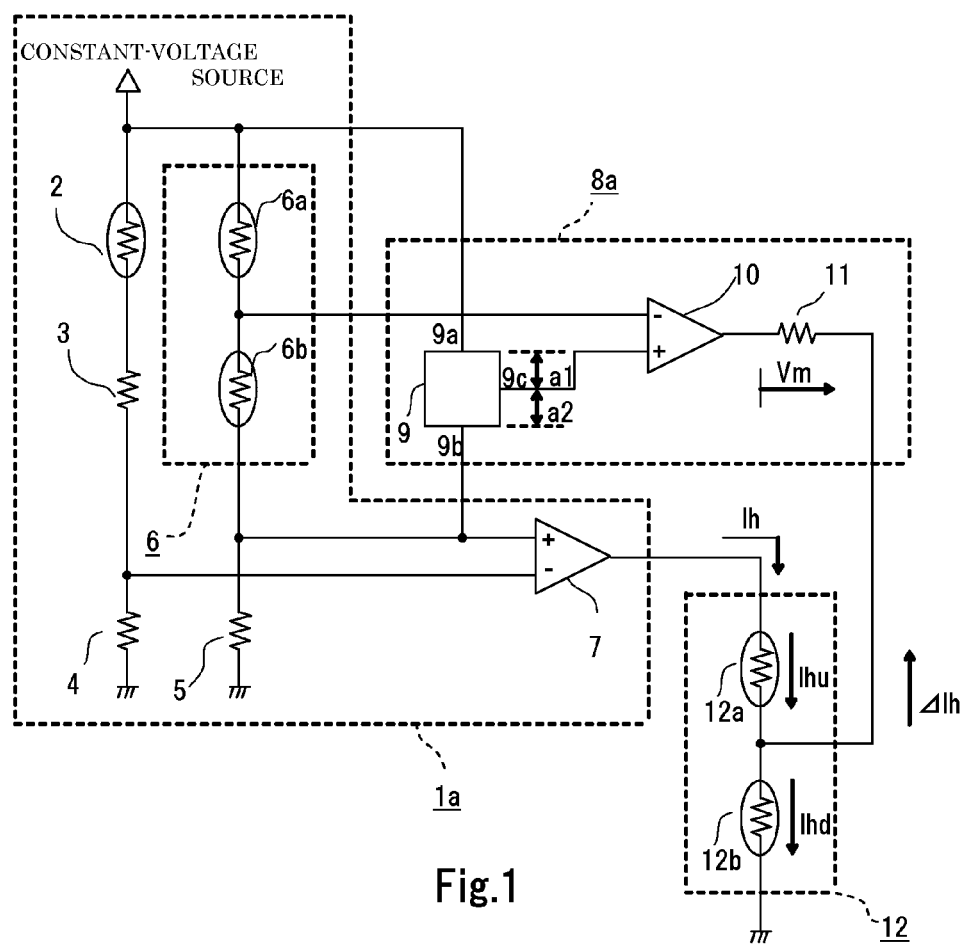
FIG. 1 is a view showing a configuration of a flow rate detection circuit in a flow sensor according to a first embodiment of the invention.

Hereinafter, a flow sensor according to a first embodiment of the invention will be described with reference to FIG. 1 through FIG. 9. The flow sensor of the invention is a thermal flow sensor of a heating current detection type. FIG. 1 is a view showing a configuration of a flow rate detection circuit in the flow sensor according to the first embodiment of the invention, and the configuration of the flow rate detection circuit will be described first using this drawing.

The flow sensor according to the first embodiment of the invention includes a fluid temperature detection portion 2 that detects a temperature of a fluid, upstream and downstream heating elements (first and second heating elements) 12a and 12b disposed, respectively, upstream and downstream in a flow direction of the fluid so as to undergo mutual thermal interference, an upstream temperature detection portion (first temperature detection portion) 6a disposed at a position under the influence of heat from the upstream heating element 12a and the fluid, and a downstream temperature detection portion (second temperature detection portion) 6b disposed at a position under the influence of heat from the downstream heating element 12b and the fluid. The flow sensor further includes an average temperature control portion (first control portion) 1a that obtains an average temperature of the upstream and downstream heating elements 12a and 12b from an average temperature of the upstream and downstream temperature detection portions 6a and 6b and controls heating currents Ihu and Ihd flown, respectively, through the upstream and downstream heating elements 12a and 12b so that the average temperature of the upstream and downstream temperature detection portions 6a and 6b is maintained at a temperature predetermined degrees higher than the temperature of the fluid detected by the fluid temperature detection portion 2. The flow sensor furthermore includes a voltage ratio control portion (second control portion) 8a that obtains a temperature difference between the upstream and downstream heating elements 12a and 12b or a ratio between voltages applied to the upstream and downstream heating elements 12a and 12b from a temperature difference between the upstream and downstream temperature detection portions 6a and 6b or a ratio between voltages applied to the upstream and downstream temperature detection portions 6a and 6b and controls the heating currents Ihu and Ihd flown, respectively, through the upstream and downstream heating elements 12a and 12b so that the temperature difference between the upstream and downstream temperature detection portions 6a and 6b or the voltage ratio between the upstream and downstream temperature detection portions 6a and 6b takes a predetermined value. The flow sensor of the first embodiment is characterized in that a detection signal corresponding to a flow direction of the fluid is obtained by the voltage ratio control portion 8a.

When the fluid temperature detection portion 2, a temperature detection portion 6, and a heating element 12 are formed of a temperature-sensitive resistant material having a resistance value varying with temperatures, such as platinum and nickel, a dividing ratio by the upstream and downstream temperature detection portions 6a and 6b depends on a temperature difference between the upstream and downstream temperature detection portions 6a and 6b.

A flow rate detection circuit includes the heating element 12 formed of a serial body of the upstream heating element 12a disposed upstream in a flow direction of the fluid and the downstream heating element 12b disposed downstream, which are formed at positions so as to undergo mutual thermal interference, and the average temperature control portion 1a controlling an average temperature of the heating element 12. The flow rate detection circuit also includes, as a component, the voltage ratio control portion 8a that controls a difference between heating currents flown through the upstream heating element 12a and the downstream heating element 12b so that a ratio between voltages applied to the upstream temperature detection portion 6a disposed at a position under the influence of heat from the upstream heating element 12a and the fluid and the downstream temperature detection portion 6b disposed at a position under the influence of heat from the downstream heating element 12b and the fluid takes a predetermined value. The upstream temperature detection portion 6a and the downstream temperature detection portion 6b together form the temperature detection portion 6.

The average temperature control portion 1a is formed of the fluid temperature detection portion 2 that measures a temperature of a fluid, resistors 3, 4, and 5, the temperature detection portion 6, and an operational amplifier 7.

Figure 2:
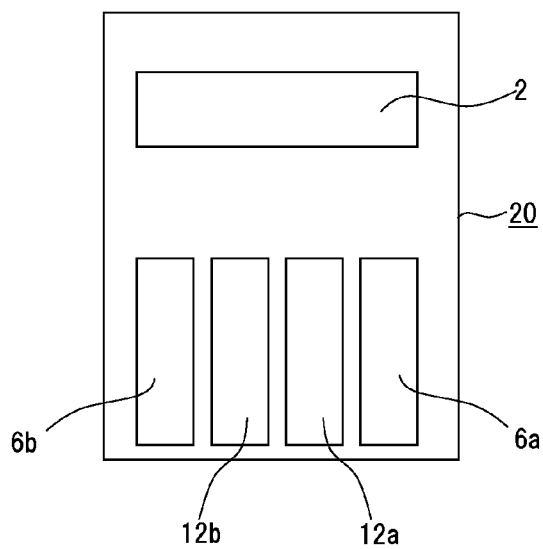
FIG. 2 is a view showing an example of a layout of heating elements, temperature detection portions, and a fluid temperature detection portion of the invention.
Figure 3:
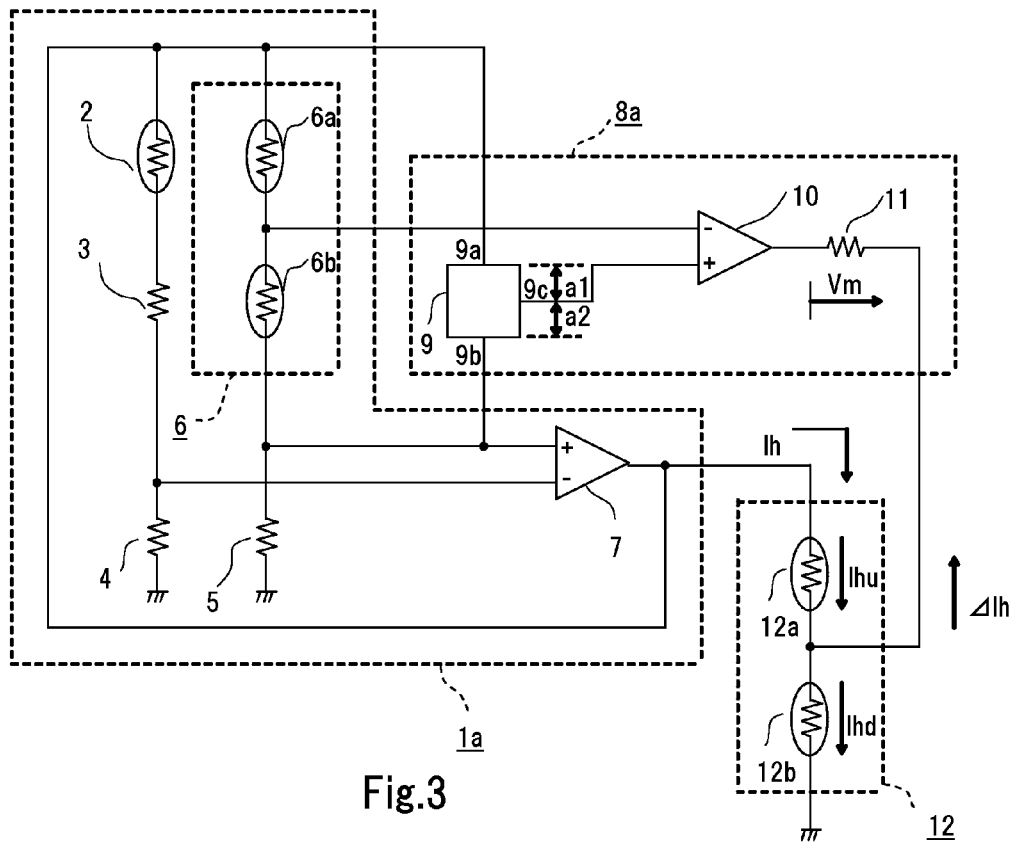
FIG. 3 is a view showing an example of a configuration of the flow rate detection circuit in the flow sensor according to the first embodiment of the invention.

Regarding the fluid temperature detection portion 2, the temperature detection portion 6, and the heating element 12, for example, as is shown in FIG. 2, the upstream temperature detection portion 6a, the upstream heating element 12a, the downstream heating element 12b, and the downstream temperature detection portion 6b are disposed sequentially from upstream to downstream in a flow of the fluid on a surface portion of the flow sensor 20 on which the fluid flows, while the fluid temperature detection portion 2 is disposed parallel to an alignment of the temperature detection portion 6 and the heating element 12 in a flow direction of the fluid.

A serial body of the fluid temperature detection portion 2, the resistor 3, and the resistor 4 is connected to a constant-voltage source on the side of the fluid temperature detection portion 2 and grounded on the side of the resistor 4 while a connection point of the resistor 3 and the resistor 4 is connected to an inverting input terminal of the operational amplifier 7. A serial body of the temperature detection portion 6 and the resistor 5 is connected to the constant-voltage source on the side of the temperature detection portion 6 and grounded on the side of the resistor 5 while a connection point of the temperature detection portion 6 and the resistor 5 is connected to a non-inverting input terminal of the operational amplifier 7. A first Wheatstone bridge is thus formed.

Both of the side of the fluid temperature detection portion 2 of the serial body of the fluid temperature detection portion 2, the resistor 3, and the resistor 4 and the side of the temperature detection portion 6 of the serial body of the temperature detection portion 6 and the resistor 5 are connected to the constant-voltage source. It should be appreciated, however, that the both sides may be connected to a power supply with a voltage fluctuation as is shown, for example, in FIG. 3.

This consideration regarding the power supply also applies to embodiments below.

Figure 4:
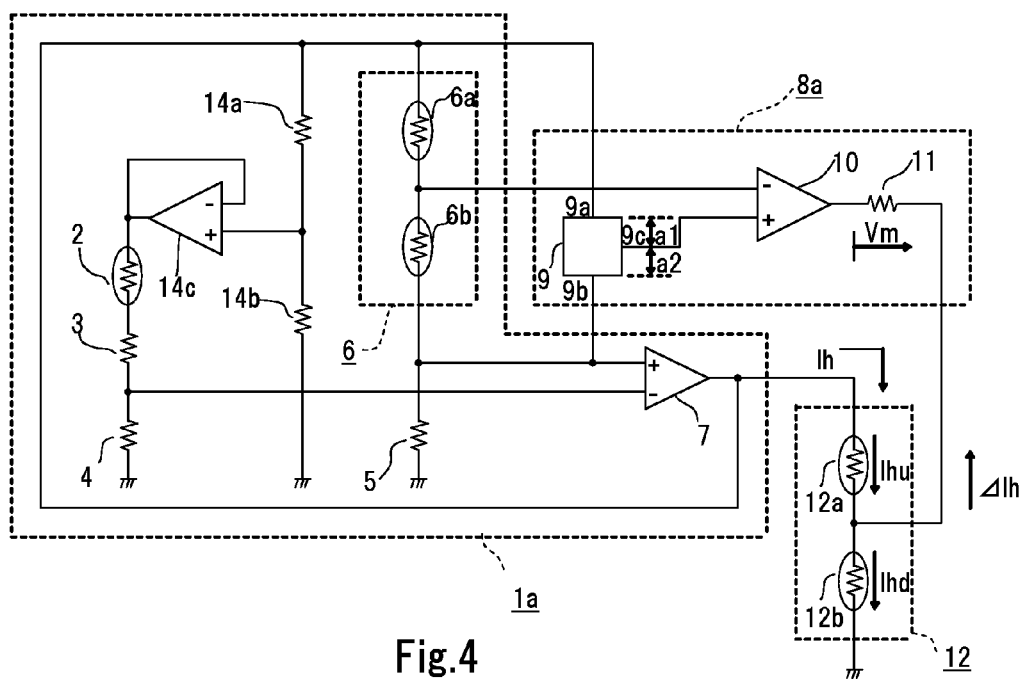
FIG. 4 is a view showing another example of the configuration of the flow rate detection circuit in the flow sensor according to the first embodiment of the invention.

The side of the fluid temperature detection portion 2 of the serial body of the fluid temperature detection portion 2, the resistor 3, and the resistor 4 and the side of the temperature detection portion 6 of the serial body of the temperature detection portion 6 and the resistor 5 are not necessarily at the same potential. It may be configured in such a manner that one voltage is proportional to the other voltage. For example, as is shown in FIG. 4, a voltage across the serial body of the temperature detection portion 6 and the resistor 5 may be divided to resistors 14a and 14b and applied on the side of the temperature detection portion 6 of the serial body of the temperature detection portion 6 and the resistor 5 via a buffer by an operational amplifier 14c. The same applies to embodiments described below.

An output terminal of the operational amplifier 7 is connected to the heating element 12 and the other end of the heating element 12 is grounded. It is therefore configured in such a manner that a heating current Ih is supplied to the heating element 12 by an output voltage of the operational amplifier 7.

The voltage ratio control portion 8a is formed of a voltage dividing portion 9, an operational amplifier 10, and a resistor 11.

In the voltage ratio control portion 8a, a connection point of the upstream temperature detection portion 6a and the downstream temperature detection portion 6b is connected to an inverting input terminal of the operational amplifier 10. A voltage across the temperature detection portion 6 is applied to input terminals 9a and 9b of the voltage dividing portion 9 and divided by the voltage dividing portion 9 at an arbitrary dividing ratio (a1:a2), and an output from an output terminal 9c is connected to a non-inverting input terminal of the operational amplifier 10. A second Wheatstone bridge is thus formed.

Figure 5:
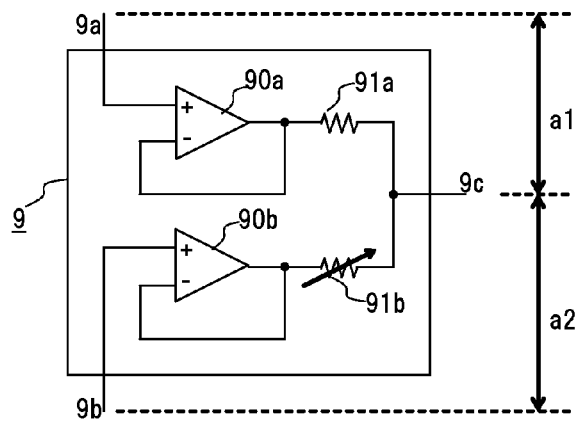
FIG. 5 is a view showing an example of a configuration of a voltage dividing portion of the invention.

The voltage dividing portion 9 is formed, for example, as is shown in FIG. 5, of operational amplifiers 90a and 90b and resistors 91a and 91b. It should be appreciated, however, that the voltage dividing portion 9 may be formed in a different manner. The same applies to the embodiments described below.

An output terminal of the operational amplifier 10 is connected to a connection point of the upstream heating element 12a and the downstream heating element 12b via the resistor 11. It is therefore configured in such a manner that a difference ΔIh between heating currents supplied to the upstream heating element 12a and the downstream heating element 12b is controlled.

An operation of the average temperature control portion 1a will now be described.

In the first Wheatstone bridge formed in the average temperature control portion 1a as described above, let R1 be a resistance value of the resistor 3, R2 be a resistance value of the resistor 4, R3 be a resistance value of the resistor 5, and Ra be a resistance value of the fluid temperature detection portion 2, then a resistance value Rs of the temperature detection portion 6 in an equilibrium condition is expressed by Equation (1) as follows:

$$Rs = (Ra + R1) \cdot R3 / R2 \quad (1)$$

Upon application of an output voltage of the operational amplifier 7, the heating current Ih is supplied to the heating element 12, so that the resistance value Rs of the temperature detection portion 6 is controlled to take a value expressed by Equation (1) above.

Hence, when the first Wheatstone bridge changes to a non-equilibrium condition due to a temperature change of the temperature detection portion 6 with a fluctuation of a flow rate of the fluid, the operational amplifier 7 operates so as to restore the original equilibrium condition by controlling the heating current Ih flown through the heating element 12.

Consequently, a temperature difference between the temperature detection portion 6 and the fluid temperature detection portion 2 is constantly maintained at a predetermined value. In this instance, the average temperature of the upstream and downstream temperature detection portions 6a and 6b detected by the temperature detection portion 6 is maintained at a temperature predetermined degrees higher than the temperature detected by the fluid temperature detection portion 2.

Figure 6:
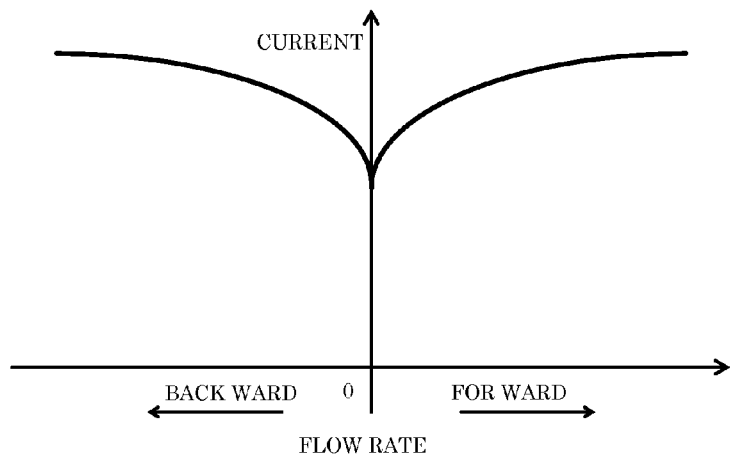
FIG. 6 is a view showing a relation of a flow rate and a heating current flown through a heating element according to the first embodiment of the invention.

Herein, let H be a heat dissipation constant of the heating element 12, Rh be a resistance value of the heating element 12, and ΔTh be a temperature difference between a heating element temperature and a fluid temperature, then the heating current Ih is expressed by Equation (2) below and a relation as shown in FIG. 6 is established because the heat dissipation constant H depends on a flow rate of the fluid.

$$Ih = (H \cdot \Delta Th / Rh)^{1/2} \quad (2)$$

An operation of the voltage ratio control portion 8a will now be described.

In the second Wheatstone bridge formed in the voltage ratio control portion 8a as described above, a ratio of a resistance value Rsu of the upstream temperature detection portion 6a to a resistance value Rsd of the downstream temperature detection portion 6b in an equilibrium condition is expressed by Equation (3) below, which is equal to the dividing ratio of the voltage dividing portion 9.

$$Rsu : Rsd = a1 : a2 \quad (3)$$

Assume that characteristics of the upstream heating element 12a and the downstream heating element 12b are the same without any discrepancy, and so are characteristics of the upstream temperature detection portion 6a and the downstream temperature detection portion 6b, then, the difference ΔIh between the heating currents is controlled by the operational amplifier 10 by setting as: a1=a2, so that a voltage ratio between the upstream temperature detection portion 6a and the downstream temperature detection portion 6b, that is, a ratio between the resistance values, is constantly equal.

In other words, the heating current Ih is supplied to the upstream heating element 12a and the downstream heating element 12b so that both of the upstream temperature detection portion 6a and the downstream temperature detection portion 6b have a temperature predetermined degrees higher than the temperature detected by the fluid temperature detection portion 2.

In a case where a flow direction of the fluid is forward, the upstream temperature detection portion 6a is cooled by the fluid and becomes less susceptible to heat from the heating element 12 whereas the downstream temperature detection portion 6b becomes more susceptible to heat through contact with the fluid heated by the heating element 12.

Hence, when the operational amplifier 7 performs the control in such a manner that a temperature difference between the upstream temperature detection portion 6a and the downstream temperature detection portion 6b becomes 0 degree, a temperature, that is, a resistance value of the upstream heating element 12a is controlled to be higher than that of the downstream heating element 12b in a case where a flow direction of the fluid is forward. In a case where a flow direction of the fluid is backward, an operation is performed inversely to the operation described above and a relation as shown in FIG. 7 is established.

Further, in a case where a flow direction of the fluid is forward, the heating current Ihu flown through the upstream heating element 12a requires a larger current than the heating current Ihd flown through the downstream heating element 12b. In a case where a flow direction of the fluid is backward, an operation is performed inversely to the operation described above and a relation as shown in FIG. 8 is established.

Herein, let Ih be a heating current supplied to the heating element 12 under the control of the average temperature control portion 1a and ΔIh be a current flown through the resistor 11 under the control of the voltage ratio control portion 8a, then the current Ihu flown through the upstream heating element 12a is expressed by Equation (4) below and the current Ihd flown through the downstream heating element 12b is expressed by Equation (5) below.

$$Ihu=Ih \qquad (4)$$

$$Ihd=Ih-\Delta Ih \qquad (5)$$

Figure 9:
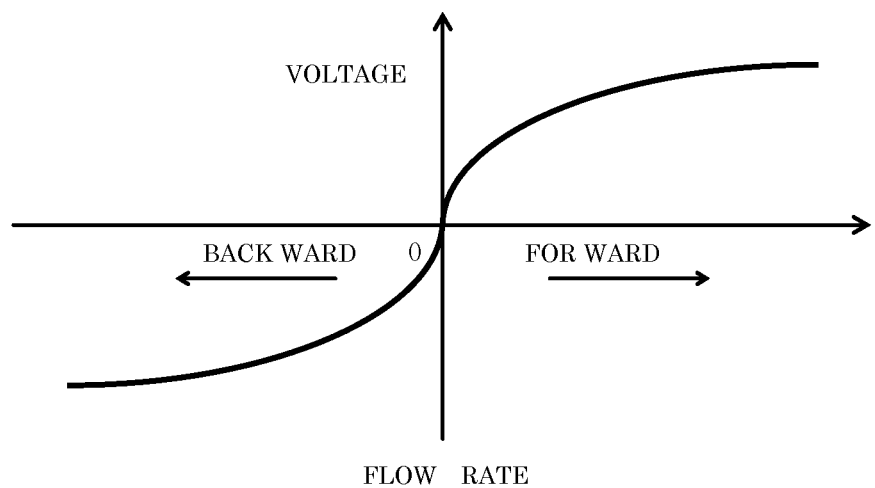
FIG. 9 is a view showing a relation of a flow rate and a detection signal according to the first embodiment of the invention.

Let Rm be a resistance value of the resistor 11, then a voltage Vm expressed by Equation (6) below is generated across the resistor 11. This voltage Vm is proportional to a difference between Equation (4) above and Equation (5) above, that is, a difference ΔIh between the heating currents supplied to the upstream heating element 12a and the downstream heating element 12b and a relation as shown in FIG. 9 is established. Hence, it becomes possible to obtain a detection signal that varies depending on a flow direction of the fluid and therefore whether a flow direction of the fluid is forward or backward can be determined.

$$\begin{aligned} Vm &= Rm \cdot (Ihu - Ihd) \\ &= Rm \cdot \Delta Ih \end{aligned} \qquad (6)$$

In actual use, both of the characteristics of the upstream heating element 12a and the downstream heating element 12b and the characteristics of the upstream temperature detection portion 6a and the downstream temperature detection portion 6b have discrepancies. It goes without saying, however, that a detection signal can be corrected arbitrarily by adjusting a dividing ratio (a1:a2) of the voltage dividing portion 9 so that, for example, Vm=0 is obtained when the flow rate is 0.

As has been described, according to the first embodiment of the invention, it becomes possible to obtain a detection signal corresponding to a flow direction of the fluid with ease and accuracy at low cost using a simple circuit.

Also, by employing the flow sensor as above to an intake system assembly in a control system of an internal combustion engine that controls the internal combustion engine, it becomes possible to obtain a detection signal corresponding to a flow direction of the fluid with ease and accuracy at low cost using a circuit simpler than the one in the related art.

Second Embodiment

Figure 10:
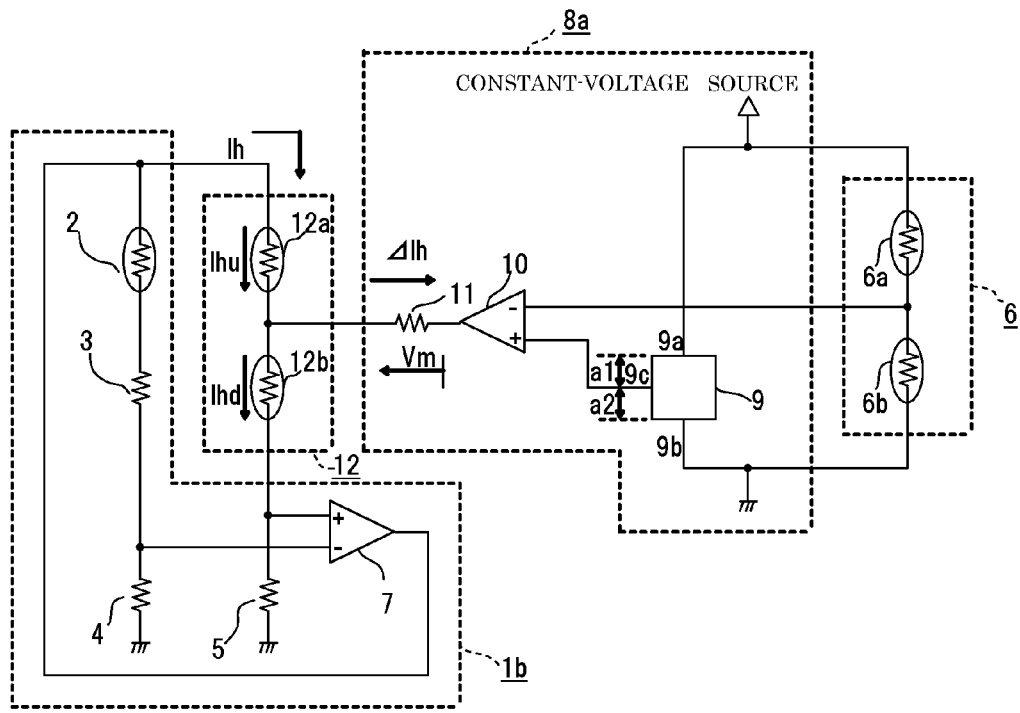
FIG. 10 is a view showing a configuration of a flow rate detection circuit in a flow sensor according to a second embodiment of the invention.

FIG. 10 is a view showing a configuration of a flow rate detection circuit in a flow sensor according to a second embodiment of the invention. Reference numerals of FIG. 10 same as those of FIG. 1 denote same or equivalent portions and a description is omitted herein.

The first embodiment above has described the control by the average temperature control portion 1a by way of example, according to which the heating currents Ihu and Ihd flown, respectively, through the upstream and downstream heating elements 12a and 12b are controlled so that an average temperature of the upstream and downstream temperature detection portions 6a and 6b is maintained at a temperature predetermined degrees higher than a temperature of the fluid detected by the fluid temperature detection portion 2. It should be noted that the second embodiment is characterized in that an average temperature control portion (first control portion) 1b performs control using an average temperature of the upstream and downstream heating elements 12a and 12b instead of an average temperature of the upstream and downstream temperature detection portions 6a and 6b.

A comparison with the flow rate detection circuit shown in FIG. 1 reveals that a flow rate detection circuit shown in FIG. 10 is different in that the average temperature control portion 1b is formed of the fluid temperature detection portion 2, the resistors 3, 4, and 5, and the operational amplifier 7 and the temperature detection portion 6 is not included.

Firstly, a configuration of the average temperature control portion 1b, which is the difference from the first embodiment above, will be described.

A serial body of the fluid temperature detection portion 2, the resistor 3, and the resistor 4 is connected to an output terminal of the operational amplifier 7 on the side of the fluid temperature detection portion 2 and grounded on the side of the resistor 4. Meanwhile, a connection point of the resistor 3 and the resistor 4 is connected to an inverting input terminal of the operational amplifier 7, and one end of the resistor 5 is grounded and the other end is connected to a non-inverting input terminal of the operational amplifier 7.

One end of the heating element 12 is connected to a connection point of an output terminal of the operational amplifier 7 and the fluid temperature detection portion 2 and the other end is connected to a connection point of the resistor 5 and the non-inverting input terminal of the operational amplifier 7. A first Wheatstone bridge is formed of the average temperature control portion 1b and the heating element 12.

The voltage ratio control portion 8a is of a configuration same as that of the first embodiment shown in FIG. 1 and a description is omitted herein.

An operation of the average temperature control portion 1b will now be described.

When the first Wheatstone bridge formed of the average temperature control portion 1b described above is in an equilibrium condition, a resistance value Rh of the heating element 12 is expressed by Equation (7) as follows:

$$Rh=(Ra+R1) \cdot R3/R2 \qquad (7).$$

Upon application of an output voltage of the operational amplifier 7, a heating current Ih is supplied to the heating element 12, and a temperature of the heating element 12 is controlled so that its resistance value Rh takes a value expressed by Equation (7) above.

Hence, when the first Wheatstone bridge changes to a non-equilibrium condition due to a temperature change of the heating element 12 with a fluctuation of a flow rate of the fluid, the operational amplifier 7 operates so as to restore the original equilibrium condition by controlling the heating current Ih flown through the heating element 12.

As a result, a temperature difference between the heating element 12 and the fluid temperature detection portion 2 is constantly maintained at a predetermined value and the heating current Ih is expressed by Equation (2) above and a relation as shown in FIG. 6 is established.

The voltage ratio control portion 8a operates in the same manner as in the first embodiment above and a ratio of the resistance value Rsu of the upstream temperature detection portion 6a to the resistance value Red of the downstream temperature detection portion 6b is expressed by Equation (8) below, which is equal to the dividing ratio of the voltage dividing portion 9.

$$Rsu:Rsd=a1:a2 \qquad (8)$$

Assume that characteristics of the upstream heating element 12a and the downstream heating element 12b are the same without any discrepancy and so are characteristics of the upstream temperature detection portion 6a and the downstream temperature detection portion 6b. Then, the difference ΔIh between the heating currents is controlled by the operational amplifier 10 by setting as: a1=a2, so that temperatures of the upstream temperature detection portion 6a and the downstream temperature detection portion 6b are constantly equal, and the current Ihu flown through the upstream heating element 12a and the current Ihd flown through the downstream heating element 12b take values expressed by Equations (4) and (5), respectively, as in the first embodiment above.

In other words, by the operations of the average temperature control portion 1b and the voltage ratio control portion 8a, the heating current Ih is supplied to the upstream heating element 12a and the downstream heating element 12b so that both of the upstream temperature detection portion 6a and the downstream temperature detection portion 6b have temperatures predetermined degrees higher than the temperature detected by the fluid temperature detection portion 2.

In this instance, a voltage expressed by Equation (6) above is generated across the resistor 11. This voltage is proportional to a difference between Equation (4) above and Equation (5) above, that is, the difference ΔIh between the heating currents supplied to the upstream heating element 12a and the downstream heating element 12b and the relation as shown in FIG. 9 is established. It thus becomes possible to obtain a detection signal that varies depending on a flow direction of the fluid and therefore whether a flow direction of the fluid is forward or backward can be determined.

As has been described, according to the second embodiment of the invention, it becomes possible to obtain a detection signal corresponding to a flow direction of the fluid with ease and accuracy at low cost using a simple circuit.

Third Embodiment

Figure 11:
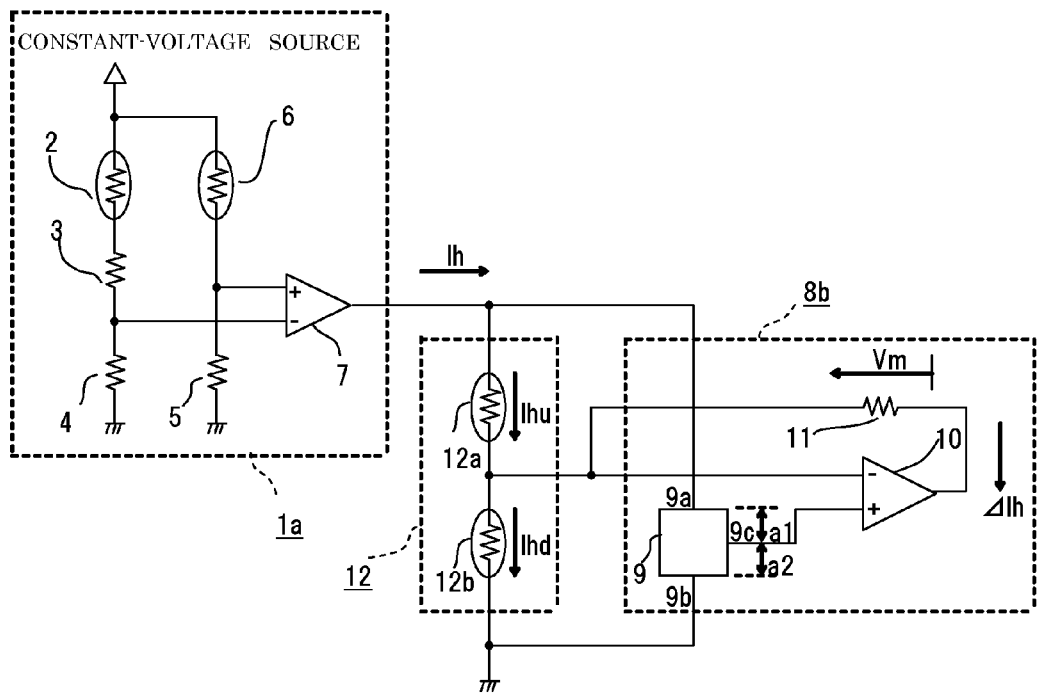
FIG. 11 is a view showing a configuration of a flow rate detection circuit in a flow sensor according to a third embodiment of the invention.

FIG. 11 is a view showing a configuration of a flow rate detection circuit in a thermal flow sensor according to a third embodiment of the invention. Reference numerals of FIG. 11 same as those of FIG. 1 denote same or equivalent portions and the average temperature control portion 1a is the same as the counterpart of the first embodiment above shown in FIG. 1, and a description is omitted herein.

The first embodiment above has described the control by the voltage ratio control portion 8a by way of example, according to which the heating currents Ihu and Ihd flown, respectively, through the upstream and downstream heating elements 12a and 12b are controlled so that a temperature difference between the upstream and downstream temperature detection portions 6a and 6b or a voltage ratio between the upstream and downstream temperature detection portions 6a and 6b takes a predetermined value. It should be noted that the third embodiment is characterized in that a voltage ratio control portion (second control portion) 8b performs control using a temperature difference or a voltage ratio between the upstream and downstream heating elements 12a and 12b instead of a temperature difference or a voltage ratio between the upstream and downstream temperature detection portions 6a and 6b.

A comparison with the flow rate detection circuit shown in FIG. 1 reveals that a flow rate detection circuit shown in FIG. 11 is different in that an input signal to the voltage ratio control portion 8b is a voltage at a connection point of the upstream heating element 12a and the downstream heating element 12b and an applied voltage to the heating element 12.

The voltage ratio control portion 8b operates in the same manner as in the first embodiment above and a ratio between a voltage Vhu applied to the upstream heating element 12a and a voltage Vhd applied to the downstream heating element 12b is expressed by Equation (9) below, which is equal to the dividing ratio of the voltage dividing portion 9. Herein, let Rhu be a resistance value of the upstream heating element 12a and Rhd be a resistance value of the downstream heating element 12b.

$$Vhu:Vhd = Rhu \cdot Ih:Rhd(Ih - \Delta Ih) \qquad (9)$$
$$= a1:a2$$

Assume that characteristics of the upstream heating element 12a and the downstream heating element 12b are the same without any discrepancy. Then, in a case where a flow direction of the fluid is forward when it is set as: a1=a2, the upstream heating element 12a is cooled by the fluid and becomes less susceptible to heat from the heating element 12 whereas the downstream heating element 12b becomes more susceptible to heat through contact with the fluid heated by the upstream heating element 12a.

Herein, a voltage at the connection point of the upstream heating element 12a and the downstream heating element 12b is to drop to or below half the voltage applied to the entire heating element 12. However, because an output of the operational amplifier 10 decreases, a difference ΔIh between the heating currents flown through the upstream heating element 12a and the downstream heating element 12b takes a positive value. Hence, this voltage is controlled to be half the applied voltage.

In a case where a flow direction of the fluid is backward, an operation is performed inversely to the operation described above, so that a difference ΔIh between the heating currents flown through the upstream heating element 12a and the downstream heating element 12b takes a negative value.

In this instance, a voltage Vm expressed by Equation (6) above is generated across the resistor 11. This voltage Vm is proportional to a difference between Equation (4) above and Equation (5) above, that is, the difference ΔIh between the heating currents supplied to the upstream heating element 12a and the downstream heating element 12b, and a relation as shown in FIG. 9 is established. It thus becomes possible to obtain a detection signal corresponding to a flow direction of the fluid.

In other words, in the third embodiment, too, it becomes possible to obtain a detection signal that varies depending on a flow direction of the fluid and therefore whether a flow direction of the fluid is forward or backward can be determined.

As has been described, according to the third embodiment of the invention, it becomes possible to obtain a detection signal that varies depending on a flow direction of the fluid with ease and accuracy at low cost using a simple circuit.

Fourth Embodiment

Figure 12:
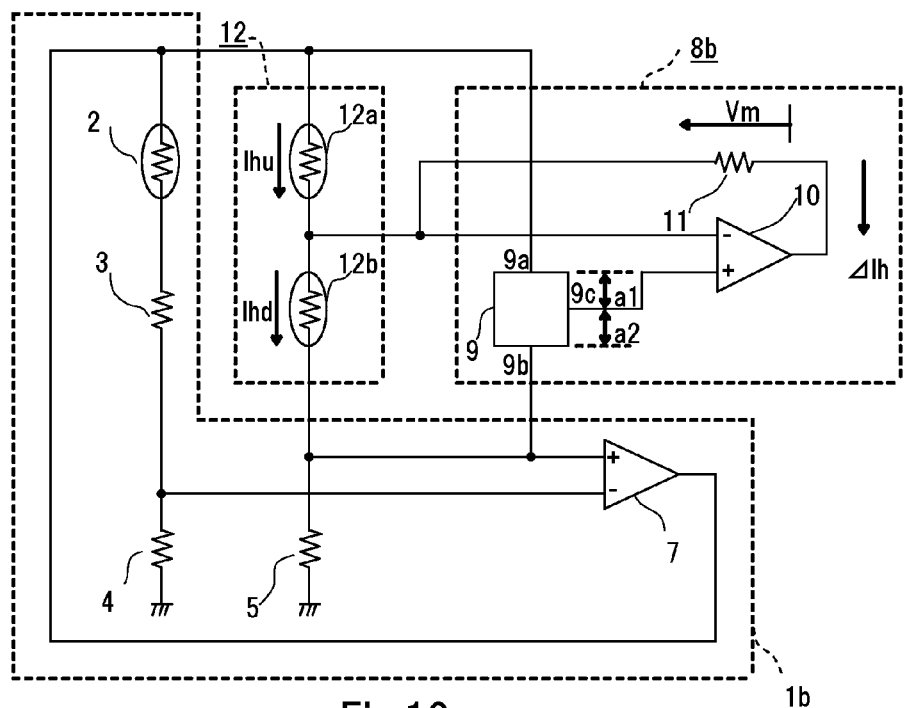
FIG. 12 is a view showing a configuration of a flow rate detection circuit in a flow sensor according to a fourth embodiment of the invention.

FIG. 12 is a view showing a configuration of a flow rate detection circuit in a thermal flow sensor according to a fourth embodiment of the invention. Reference numerals of FIG. 12 same as those of FIG. 11 denote same or equivalent portions and a description is omitted herein.

The first embodiment above has described the control by the average temperature control portion 1a by way of example, according to which the heating currents Ihu and Ihd flown, respectively, through the upstream and downstream heating elements 12a and 12b are controlled so that an average temperature of the upstream and downstream temperature detection portions 6a and 6b is maintained at a temperature predetermined degrees higher than a temperature of the fluid detected by the fluid temperature detection portion 2. It should be noted that the fourth embodiment is characterized in that an average temperature control portion (first control portion) 1b performs control using an average temperature of the upstream and downstream heating elements 12a and 12b instead of an average temperature of the upstream and downstream temperature detection portions 6a and 6b in the same manner as in the second embodiment above.

Further, the first embodiment above has described the control by the voltage ratio control portion 8a by way of example, according to which the heating currents Ihu and Ihd flown, respectively, through the upstream and downstream heating elements 12a and 12b are controlled so that a temperature difference between the upstream and downstream temperature detection portions 6a and 6b or a voltage ratio between the upstream and downstream temperature detection portions 6a and 6b takes a predetermined value. It should be noted that the fourth embodiment is characterized in that a voltage ratio control portion (second control portion) 8b performs control using a temperature difference or a voltage ratio between the upstream and downstream heating elements 12a and 12b instead of a temperature difference or a voltage ratio between the upstream and downstream temperature detection portions 6a and 6b in the same manner as in the third embodiment.

A flow rate detection circuit shown in FIG. 12 is formed of the average temperature control portion 1b, the voltage ratio control portion 8b, and the heating element 12. The average temperature control portion 1b is the same as the counterpart of the second embodiment above shown in FIG. 10 and the voltage ratio control portion 8b is the same as the counterpart of the third embodiment above shown in FIG. 11, and a description is omitted herein.

In other words, in the fourth embodiment, too, a difference ΔIh between the heating currents supplied to the upstream heating element 12a and the downstream heating element 12b can be detected. It thus becomes possible to obtain a detection signal that varies depending on a flow direction of the fluid and therefore whether a flow direction of the fluid is forward or backward can be determined.

As has been described, according to the fourth embodiment of the invention, it becomes possible to obtain a detection signal corresponding to a flow direction of the fluid with ease and accuracy at low cost using a simple circuit.

Fifth Embodiment

Figure 13:
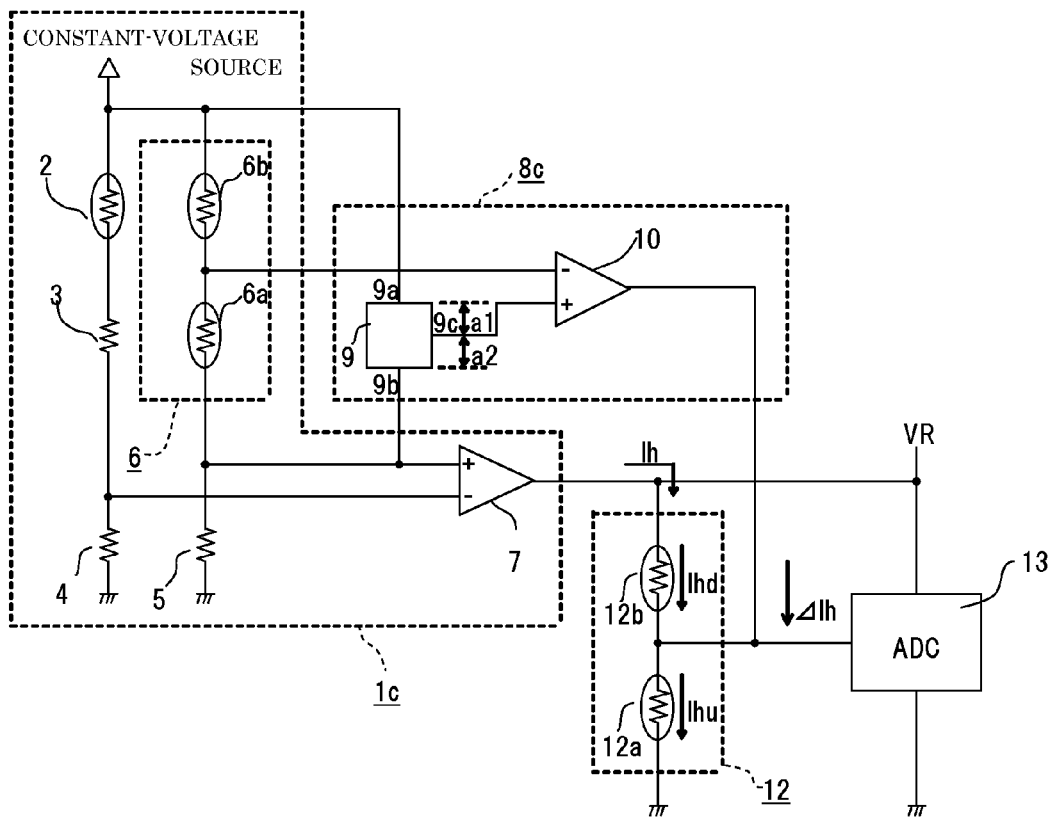
FIG. 13 is a view showing a configuration of a flow rate detection circuit in a flow sensor according to a fifth embodiment of the invention.

A flow sensor according to a fifth embodiment of the invention will now be described using FIG. 13 through FIG. 15. FIG. 13 is a view showing a configuration of a flow rate detection circuit in a thermal flow sensor according to the fifth embodiment of the invention. Reference numerals of FIG. 13 same as those of FIG. 1 denote same or equivalent portions and a description is omitted herein.

In the first embodiment above, a flow direction of the fluid is determined using a difference ΔIh between the heating currents obtained by the control of the voltage ratio control portion 8a as a detection signal. The fifth embodiment will describe a case where a determination is made using a ratio between voltages applied to the upstream heating element 12a and the downstream heating element 12b obtained by the control of the voltage ratio control portion 8c as a detection signal.

A comparison with the flow rate detection circuit of FIG. 1 reveals that the flow rate detection circuit of FIG. 13 is different in that: the resistor 11 is omitted and a short circuit is produced; a connection position of the upstream heating element 12a and the downstream heating element 12b is opposite; and a connection position of the upstream temperature detection portion 6a and the downstream temperature detection portion 6b is opposite.

An average temperature control portion 1c supplies heating currents to the heating element 12 by means of the operational amplifier 7, so that a temperature difference between the temperature detection portion 6 and the fluid temperature detection portion 2 constantly takes a predetermined value as in the first embodiment above.

Assume that characteristics of the upstream heating element 12a and the downstream heating element 12b are the same without any discrepancy and so are characteristics of the upstream temperature detection portion 6a and the downstream temperature detection portion 6b. Then, by setting as: a1=a2, the voltage ratio control portion 8c controls the heating currents by means of the operational amplifier 10, so that temperatures of the upstream temperature detection portion 6a and the downstream temperature detection portion 6b are constantly equal as in the first embodiment above.

In a case where a flow direction of the fluid is forward, the upstream temperature detection portion 6a is cooled by the fluid and becomes less susceptible to heat from the heating element 12 whereas the downstream temperature detection portion 6b becomes more susceptible to heat through contact with the fluid heated by the heating element 12.

Figure 7:
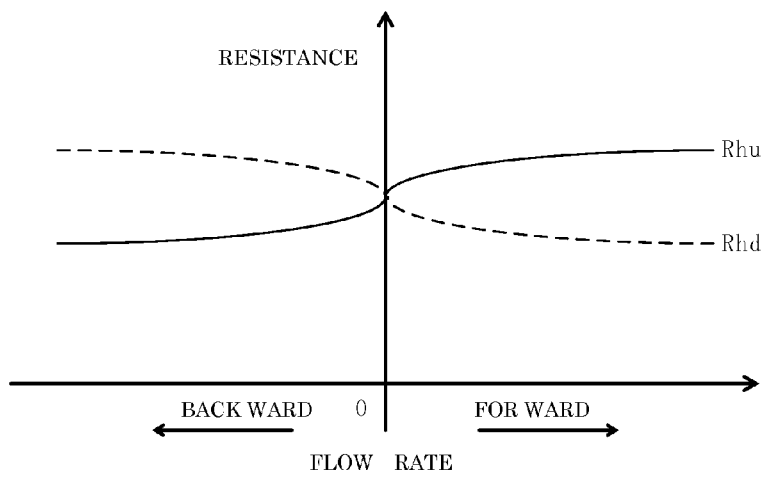
FIG. 7 is a view showing a relation of a flow rate and resistance values of an upstream heating element and a downstream heating element according to the first embodiment of the invention.

Hence, by performing the control by means of the operational amplifier 7 so that a temperature difference between the upstream temperature detection portion 6a and the downstream temperature detection portion 6b becomes 0 degree, a temperature, that is, a resistance value of the upstream heating element 12a is controlled to be higher than a temperature of the downstream heating element 12b in a case where the flow direction of the fluid is forward and a relation as shown in FIG. 7 is established.

Figure 8:
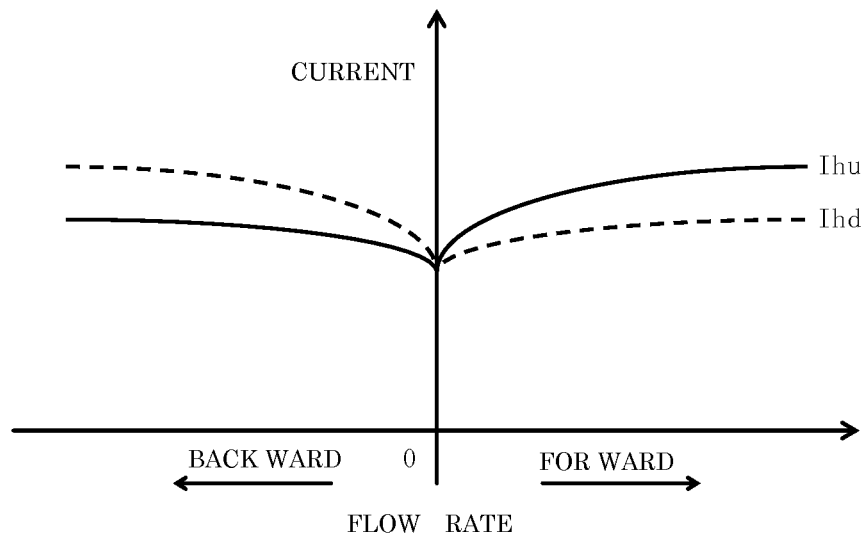
FIG. 8 is a view showing a relation of a flow rate and heating currents flown through the upstream heating element and the downstream heating element according to the first embodiment of the invention.

Further, a heating current Ihu flown through the upstream heating element 12a in this instance requires a larger current than a heating current Ihd flown through the downstream heating element 12b and a relation as shown in FIG. 8 is established.

Figure 14:
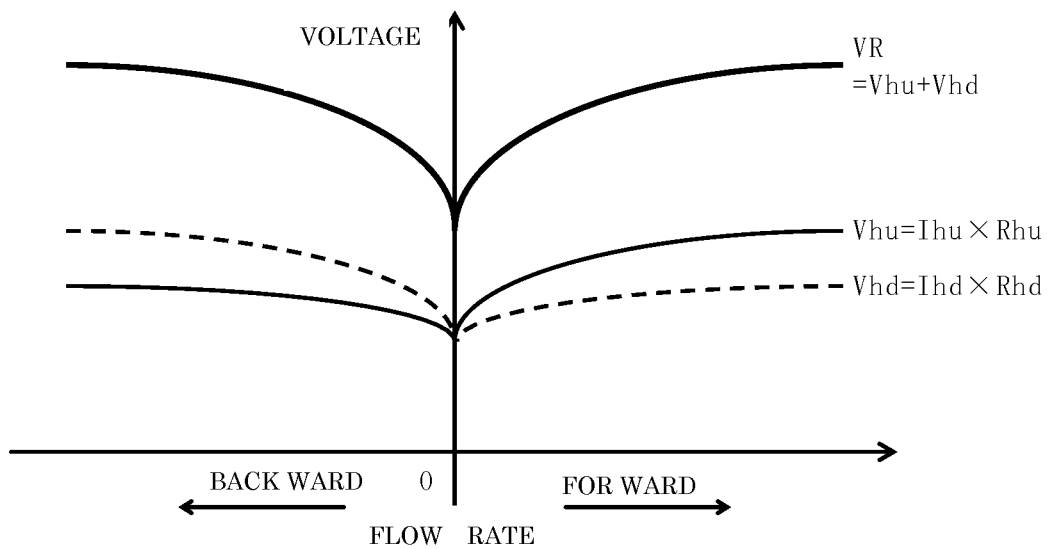
FIG. 14 is a view showing a relation of a flow rate and voltages applied to heating elements according to the fifth embodiment of the invention.

Herein, let VR be an applied voltage to the heating element 12, Vhu be an applied voltage to the upstream heating element 12a, and Vhd be an applied voltage to the downstream heating element 12b, which are expressed by Equation (10) below and a relation as shown in FIG. 14 is established.

$VR = Vhu + Vhd$ $Vhu = Rhu * Ihu$ $Vhd = Rhd * Ihd$ (10)

Figure 15:
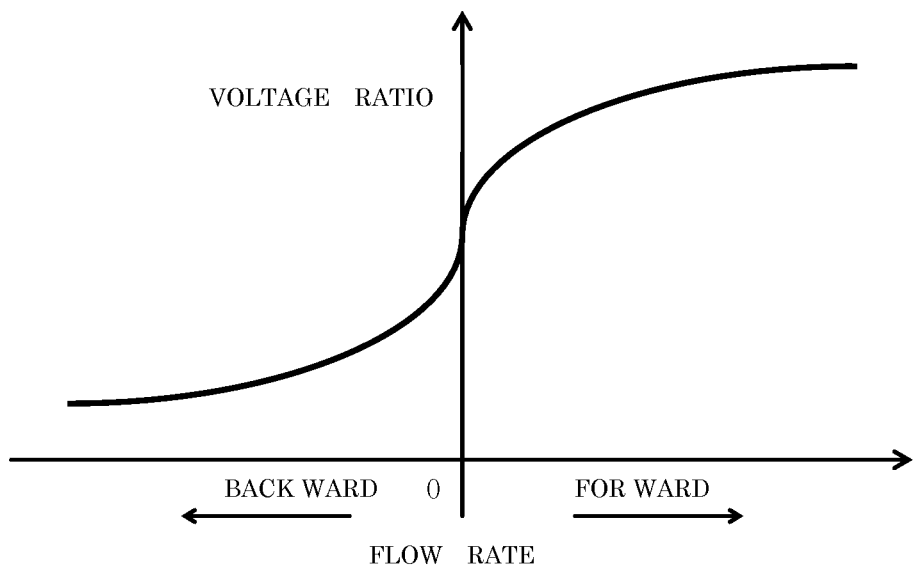
FIG. 15 is a view showing a relation of a flow rate and a ratio between voltages applied to an upstream heating element and a downstream heating element according to the fifth embodiment of the invention.

Further, with a voltage ratio between the applied voltage Vhu to the upstream heating element 12a and the applied voltage VR to the heating element 12, a relation as shown in FIG. 15 is established.

The voltage ratio between the applied voltage Vhu to the upstream heating element 12a and the applied voltage VR to the heating element 12 is calculated, for example, by an A-to-D converter 13.

The A-to-D converter 13 applies A-to-D conversion to the applied voltage Vhu to the upstream heating element 12a, which is an input signal therein, in reference to the applied voltage VR to the heating element 12 as a reference voltage.

In a case where the A-to-D converter 13 has an (n)-bit resolution, digital data quantized by the A-to-D converter 13 is expressed by Equation (11) below and detectable as a flow rate signal.

$$Vhu/VR \times (2^{(n)}-1) \qquad (11)$$

In the fifth embodiment, a voltage ratio between Vhu and VR is used as a detection signal. It should be appreciated, however, that a voltage ratio between Vhu and Vhd can be used as well.

As has been described, according to the fifth embodiment of the invention, it becomes possible to obtain a detection signal that varies depending on a flow direction of the fluid with ease and accuracy at low cost using a simple circuit.

It is to be understood that the respective embodiments of the embodiment can be combined without any restriction and the respective embodiments can be modified and omitted as the need arises within the scope of the invention.

Various modifications and alterations of this invention will be apparent to those skilled in the art without departing from the scope and spirit of this invention, and it should be understood that this is not limited to the illustrative embodiments set forth herein.

What is claimed is:

1. A flow sensor, comprising:
   a fluid temperature detection portion that detects a temperature of a fluid;
   first and second heating elements that are disposed, respectively, upstream and downstream in a flow direction of the fluid so as to undergo mutual thermal interference;
   a first control portion that controls heating currents flown through the respective first and second heating elements so that an average temperature of the first and second heating elements is maintained at a temperature predetermined degrees higher than the temperature of the fluid detected by the fluid temperature detection portion; and
   a second control portion that controls the heating currents flown through the respective first and second heating elements so that one of a temperature difference between the first and second heating elements and a ratio between voltages applied to the respective first and second heating elements takes a predetermined value,
   wherein a detection signal corresponding to the flow direction of the fluid is obtained by the second control portion.

2. The flow sensor according to claim 1, further comprising:
   a first temperature detection portion disposed at a position under influence of heat from the first heating element and the fluid; and
   a second temperature detection portion disposed at a position under influence of heat from the second heating element and the fluid,
   wherein the average temperature is obtained from temperatures of the first and second temperature detection portions.

3. The flow sensor according to claim 2, further comprising:
   a first temperature detection portion disposed at a position under influence of heat from the first heating element and the fluid; and
   a second temperature detection portion disposed at a position under influence of heat from the second heating element and the fluid,
   wherein the temperature difference is obtained by a temperature difference between the first and second temperature detection portions and the ratio between the voltages is obtained by a ratio between voltages applied to the first and second temperature detection portions.

4. The flow sensor according to claim 1, further comprising:
   a first temperature detection portion disposed at a position under influence of heat from the first heating element and the fluid; and
   a second temperature detection portion disposed at a position under influence of heat from the second heating element and the fluid,
   wherein the temperature difference is obtained by a temperature difference between the first and second temperature detection portions and the ratio between the voltages is obtained by a ratio between voltages applied to the first and second temperature detection portions.

5. The flow sensor according to claim 4, wherein:
   the second control portion controls the heating currents flown through the respective first and second heating elements so that the temperature difference between the first and second temperature detection portions is 0 degree.

6. The flow sensor according to claim 4, wherein:
   the second control portion controls the heating currents flown through the respective first and second heating elements so that the temperature difference between the first and second heating elements is 0 degree.

7. The flow sensor according to claim 1, wherein:
   the first and second heating elements are electrically connected in series.

8. The flow sensor according to claim 1, wherein:
   the detection signal is a current controlled by the second control portion.

9. The flow sensor according to claim 1, wherein:
   the detection signal is a ratio between voltages applied to the first heating element and the second heating element controlled by the second control portion.

10. A control system of an internal combustion engine provided to an internal combustion engine and controlling the internal combustion engine, wherein:
    the flow sensor set forth in claim 1 is provided to an intake system assembly of the internal combustion engine and determines whether a flow of intake air to the intake system assembly is forward or backward.

* * * * *